United States Patent
Fegg et al.

(10) Patent No.: US 7,171,933 B2
(45) Date of Patent: Feb. 6, 2007

(54) INTAKE SYSTEM FOR A COMBUSTION ENGINE WITH AT LEAST TWO ROWS OF CYLINDER HEADS

(75) Inventors: Stefan Fegg, Korntal-Muenchingen (DE); Thorsten Wunsch, Wimsheim (DE); Claudia Romberg, Stuttgart (DE)

(73) Assignee: Dr. Ing h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/154,469

(22) Filed: Jun. 17, 2005

(65) Prior Publication Data

US 2005/0279311 A1 Dec. 22, 2005

(30) Foreign Application Priority Data

Jun. 19, 2004 (DE) ...................... 10 2004 029 746

(51) Int. Cl.
*F02M 35/10* (2006.01)

(52) U.S. Cl. .................................. 123/184.36

(58) Field of Classification Search ........... 123/184.36, 123/184.53, 184.57, 184.21, 184.35, 184.34
See application file for complete search history.

(56) References Cited

U.S. PATENT DOCUMENTS 6,192,850 B1 2/2001 Rutschmann et al.
6,250,272 B1 6/2001 Rutschmann et al.

FOREIGN PATENT DOCUMENTS

| DE | 4014291 A1 | * 11/1991 |
|---|---|---|
| DE | 198 14 970 A1 | 10/1999 |
| DE | 198 42 724 A1 | 3/2000 |
| DE | 103 21 323 B3 | 12/2004 |

* cited by examiner

*Primary Examiner*—Stephen K. Cronin
*Assistant Examiner*—Hyder Ali
(74) *Attorney, Agent, or Firm*—Crowell & Moring LLP

(57) ABSTRACT

An intake system for a combustion engine has at least two rows of cylinder heads, each of which features an intake manifold with individual pipes leading to the cylinders. The intake manifolds are connected to one another through transverse ducts equipped with switching valves as well as to an air supply duct leading to one of the transverse ducts, which features a throttle valve to regulate the air volume. The air supply duct is preferably comprised of a double-fluted distributor pipe leading to one of the transverse ducts. A throttle valve housing is connected upstream of the distributor pipe, and an interior wall is integrated into the distributor pipe, thereby dividing the interior space thereof into two interior ducts of virtually equal cross section.

9 Claims, 4 Drawing Sheets

INTAKE SYSTEM FOR A COMBUSTION ENGINE WITH AT LEAST TWO ROWS OF CYLINDER HEADS

This application claims the priority of German application 10 2004 029 746.0, filed Jun. 19, 2004, the disclosure of which is expressly incorporated by reference herein.

BACKGROUND AND SUMMARY OF THE INVENTION

The present invention relates to an intake system for a combustion engine with at least two rows of cylinder heads including an intake manifold for each of the cylinder head rows connected to pipes leading to cylinders, transverse pipes connecting the intake manifolds to one another, and an air supply duct leading to at least one of the transverse pipes, and in which each of the transverse pipes is equipped with a throttle valve to regulate air volume.

Intake systems featuring resonance turbocharging for optimal cylinder filling at various RPMs and loads are known from the prior art. German document DE 198 14 970 A1 describes an intake system in which, aided by an adjustable control mechanism with a continuous range, the resonance chamber volume can be precisely adapted load or RPM. Attached to the resonance chamber is a double-fluted intake manifold, which is situated downstream from a throttle valve connected to a common section of pipe. As a result of this configuration, the gas column can oscillate between the two cylinder heads according to the opening and closing of the intake valves situated at each cylinder head, thereby facilitating a dynamic supercharging of the combustion engine.

An intake system with adjustable resonance volume is known from German document DE 198 42 724 A1. In this design the resonance chambers for the cylinder head rows are connected to one another via two transverse ducts. Both transverse ducts feature throttle valves, through which the resonance frequency of the intake system can be adjusted to provide optimal filling of the cylinders. Two individual intake manifolds project from a transverse duct connecting both resonance chambers. At its junction with the transverse duct, each intake manifold features a throttle valve for regulating intake air volume.

An adjustable intake system is known from unpublished German patent application 103 21 323.6. As opposed to the system described in German document DE 198 42 724 A1, with its dual throttle valve construction, only one throttle valve is present in a common pre-intake line. Through this feature, the overall length of the intake ducting can be adjusted, because the common intake pipe connected to the two individual intake manifolds does not influence the distance covered by the oscillation of the gas column between the two resonance chambers. The air filter housing upstream from the throttle valve can therefore be better adapted to the available space and arranged in a simple manner among the engine components.

An object of the invention is the further improvement of the intake system in terms of cost and arrangement freedom while retaining functionality.

This object of the invention can be achieved by providing the air supply duct with a double-fluted distributor pipe leading to one of the transverse pipes and connected downstream of a throttle valve housing, and by having an interior wall, integrated into the distributor pipe, divide the interior of the distributor pipe into two interior ducts of virtually equal cross section.

Unlike the intake system design described in German document DE 103 21 323.6, the individual pipes leading to a transverse duct of the intake system are merged in a double-fluted distributor pipe, wherein an interior wall is integrated into the distributor pipe. The interior wall functions to divide the interior space of the distributor pipe into two interior ducts of virtually equal cross section. In this way, the dimensions and the material costs for the intake system are reduced in an advantageous manner. The distributor pipe is preferably made of a synthetic material, wherein the distributor pipe and interior wall can be produced simultaneously through injection molding.

Additional advantageous embodiments and further developments of the intake system are possible through additionally claimed features.

The throttle valve present in a first transverse duct is mounted via one end of its axle to the interior wall integrated in the distributor pipe. As a result, when the valves are open—during which time both intake manifolds are directly connected via the transverse duct—a minimal intake air resistance is present, because the valve axle is turned in the direction of the airflow.

An embodiment of the invention is further described and illustrated in the description and drawings.

DETAILED DESCRIPTION OF THE INVENTION

Figure 1:
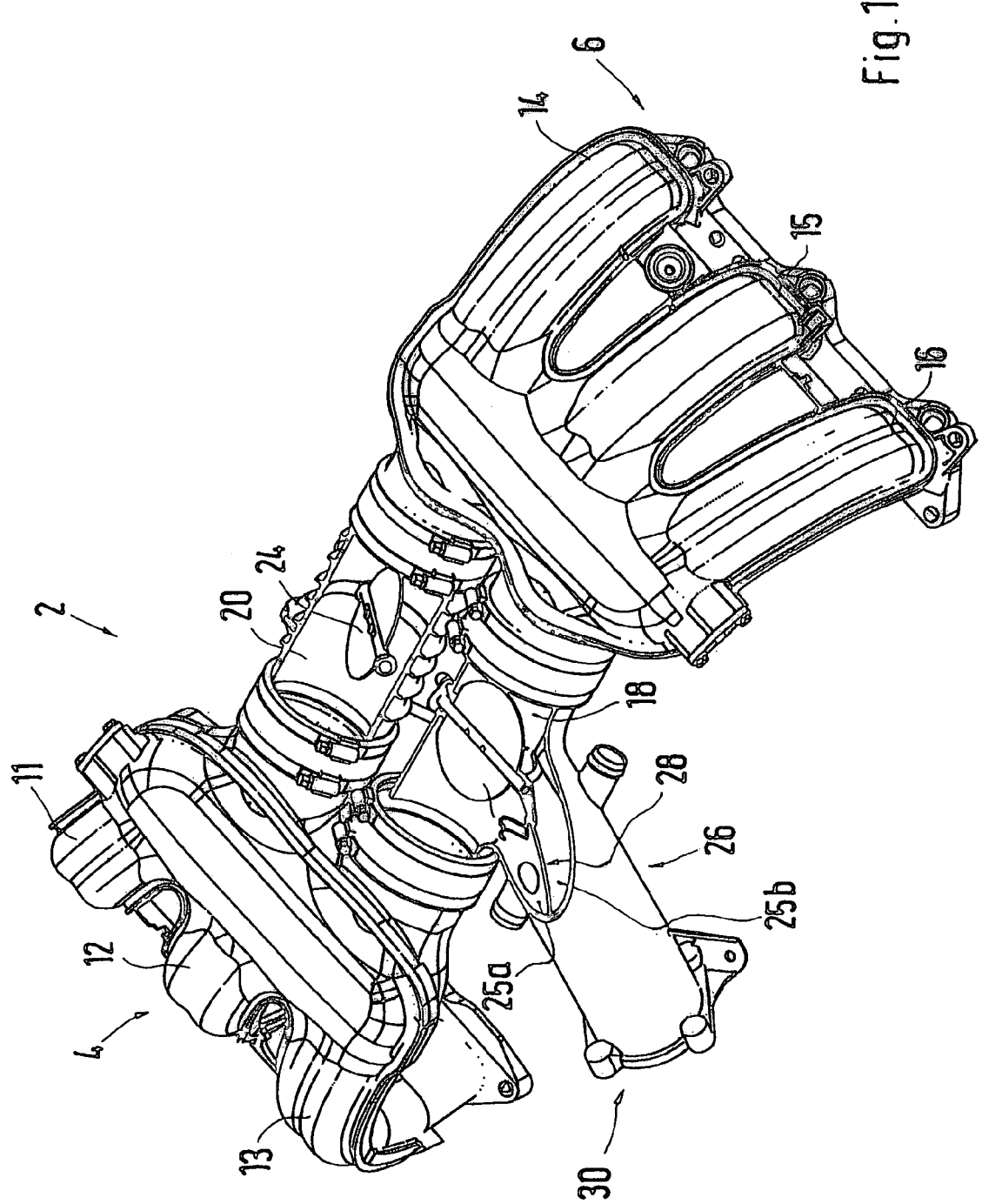
FIG. 1 is a schematic illustration of the intake system.
Figure 2:
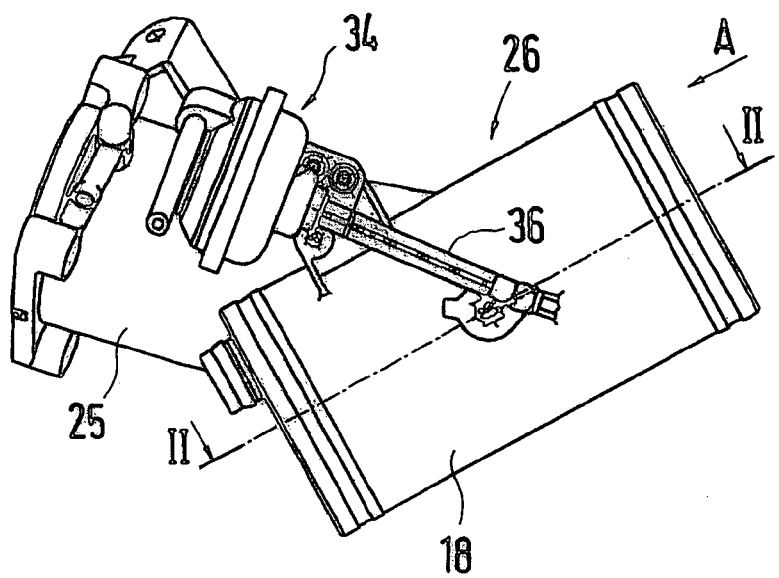
FIG. 2 is a perspective view of a distributor pipe module of the intake system.
Figure 3:
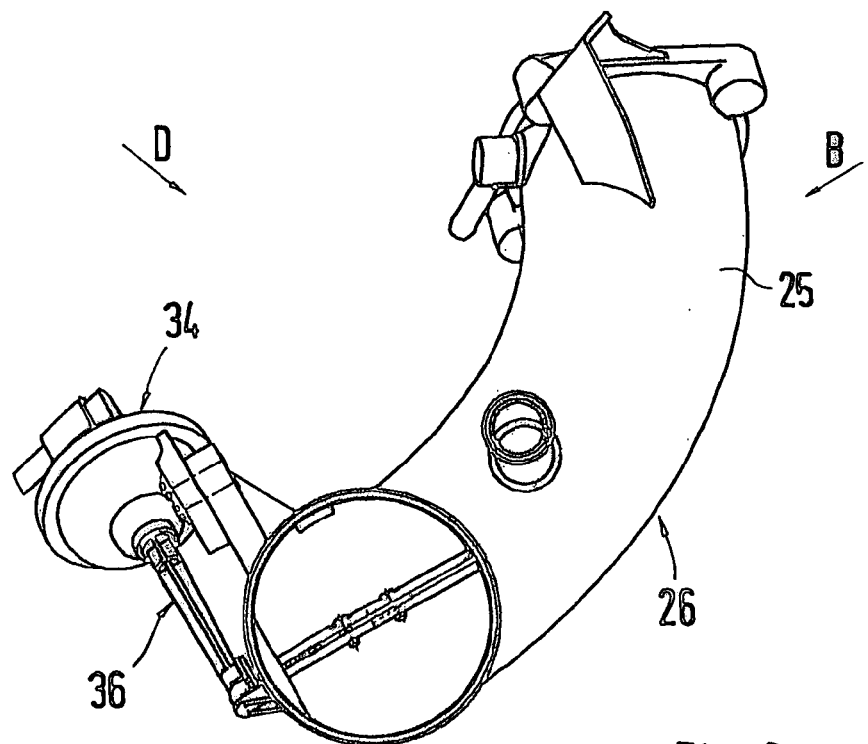
FIG. 3 is a view of the distributor pipe module in direction A indicated in FIG. 2.
Figure 4:
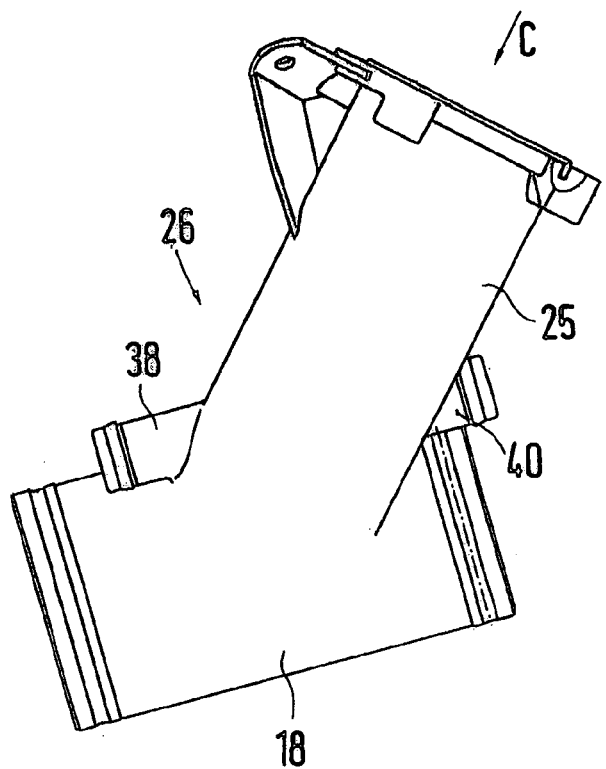
FIG. 4 is a view of the distributor pipe module in direction B indicated in FIG. 3.
Figure 5:
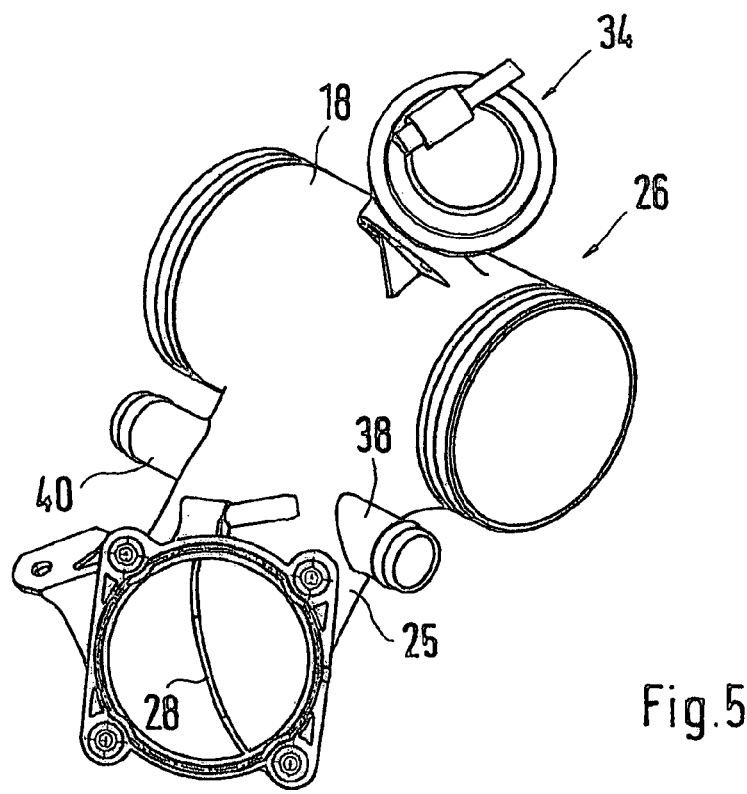
FIG. 5 is a view of the distributor pipe module in direction C indicated in FIG. 4.
Figure 6:
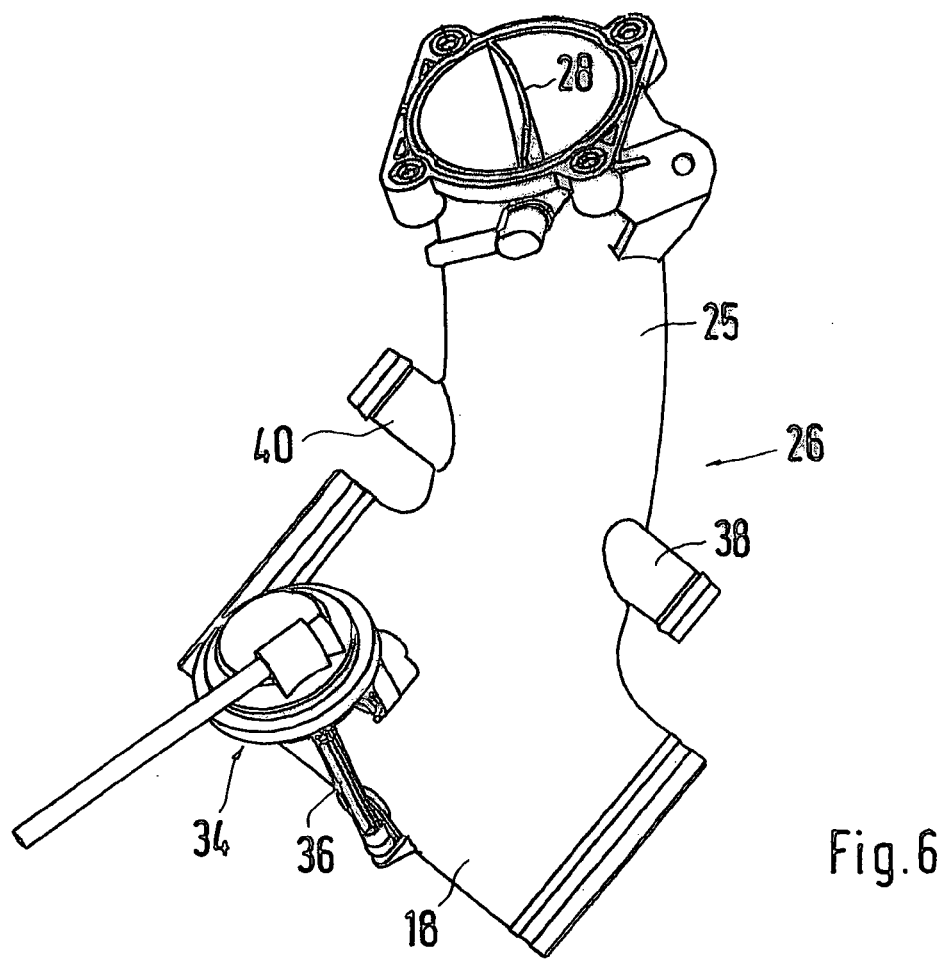
FIG. 6 is a view of the distributor pipe module in direction D of FIG. 3.
Figure 7:
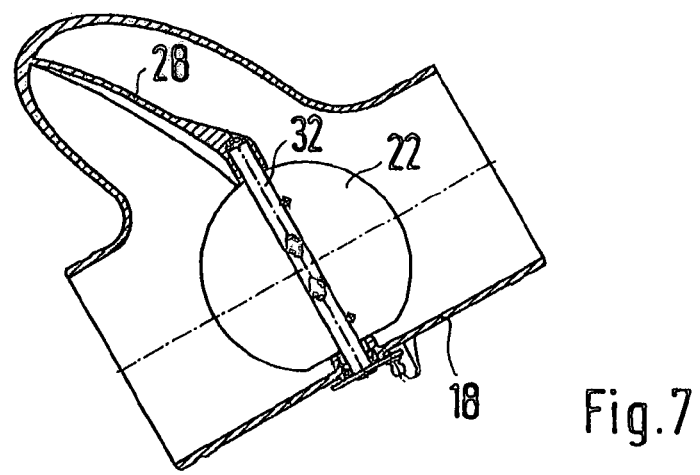
FIG. 7 is a view, in a cross section, of the distributor pipe module along line II—II in FIG. 2.

The illustrated intake system 2 for a six-cylinder Boxer engine features, for the cylinder rows, intake manifolds 4 and 6 with individual intake pipes 11 to 13 and 14 to 16, each of which leads to a cylinder head (not illustrated). The intake manifolds 4 and 6 are connected via two transverse ducts, which are illustrated as connecting pipes 18 and 20. In the exact center of each connecting pipe 18 and 20 is a throttle valve 22 and 24, the function of which shall be further described below. The first connecting pipe 18 is formed in one piece with a double-fluted distributor pipe 25, in which two interior ducts 25a and 25b are designed to run along a defined length of resonance pipe. Connecting pipe 18 and distributor pipe 25 together form a distributor pipe module 26. An interior wall 28 is integrated in distributor pipe 25. The interior wall 28 is situated in the interior of the distributor pipe 25 so as to form the two interior ducts, 25a and 25b, with equal cross section. Using core rotation, the distributor pipe module 26 is injection molded as one piece with its interior wall 28. As FIG. 7 illustrates, the axle 32 of the throttle valve 22 is mounted with its one end at the housing wall of the connecting pipe 18 and with its other end at the interior wall 28 of the distributor pipe 25. To control the throttle valve 22, a vacuum controlled diaphragm box 34 is attached to the distributor pipe module 26. The vacuum controlled diaphragm box 34 is connected to the throttle valve 22 via a push rod 36. Two connections 38 and 40 projecting from the distributor pipe 25 serve to ventilate the crank shaft housing, wherein the blow-by gases from the crank shaft housing are redirected into the intake system, while other connections serve to ventilate the tank.

Upstream, a throttle valve housing 30 is connected to the end of the distributor pipe 25. A throttle valve is integrated into the throttle valve housing 30 to regulate air volume. An airflow meter and the air filter housing of the combustion engine are downstream from the throttle valve housing 30.

The resonance-intake system functions in the following way: At a low RPM of preferably between 1000 and 3500, the respective throttle valves 22 and 24 in connecting pipes 18 and 20 are closed. As a result, the combustion air is directed separately into both intake manifolds 4 and 6 via the distributor pipe module 26. Through the staggered opening and closing of the intake valves in both cylinder head rows, the gas columns can oscillate between the two intake manifolds 4 and 6 via the interior ducts 25a and 25b of the distributor pipe 25. At a moderate RPM of, for example, between 3,500 and 5,000, the throttle valve 22 in the distributor pipe 18 is opened, while the second throttle valve 24 in the second distributor pipe 20 remains closed. The opening of the throttle valve 22 changes the resonance frequency of the intake system in such a way that, as a result of the resonance oscillation, a dynamic supercharging and thereby a better filling of the cylinder with combustion air is achieved. At a high RPM of, for example, between 5,000 and 7,000, the second throttle valve 24 is also opened, thereby allowing the resonance frequency of the intake system to be appropriately adapted for optimal filling of the cylinder.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An intake system for a combustion engine having at least two cylinder head rows comprising:
    an intake manifold for each of the cylinder head rows connected to pipes leading to cylinders,
    transverse pipes connecting the intake manifolds to one another, and
    an air supply duct leading to at least one of the transverse pipes,
    wherein each of the transverse pipes is equipped with a throttle valve to regulate air volume,
    wherein the air supply duct comprises a double-fluted distributor pipe leading to one of the transverse pipes and connected downstream of a throttle valve housing,
    wherein an interior wall, integrated into the distributor pipe, divides the interior of the distributor pipe into two interior ducts of virtually equal cross section, and
    wherein the throttle valve found in the one of the transverse pipes has a valve axle which is mounted, on one end, to the interior wall.

2. The intake system as claimed in claim 1, wherein each throttle valve is disposed at the exact center of one of the transverse pipes.

3. The intake system as claimed in claim 2, wherein the one of the transverse pipes and the distributor pipe are formed in one piece and constitute a distributor pipe module.

4. The intake system as claimed in claim 1, wherein the one of the transverse pipes and the distributor pipe are formed in one piece and constitute a distributor pipe module.

5. A process of operating an intake system for a combustion engine having at least two cylinder head rows including an intake manifold for each of the cylinder head rows connected to pipes leading to cylinders, transverse pipes connecting the intake manifolds to one another, and an air supply duct leading to at least one of the transverse pipes, the air supply duct comprising a double-fluted distributor pipe leading to one of the transverse pipes and connected downstream of a throttle valve housing, and an interior wall being integrated into the distributor pipe and dividing the interior of the distributor pipe into two interior ducts of virtually equal cross section, comprising:
    regulating air volume by way of a throttle valve disposed in each of the transverse pipes,
    wherein the throttle valve found in the one of the transverse pipes has a valve axle which is mounted, on one end, to the interior wall.

6. The process as claimed in claim 5, wherein each throttle valve is disposed at the exact center of one of the transverse pipes.

7. The process as claimed in claim 6, wherein the one of the transverse pipes and the distributor pipe are formed in one piece and constitute a distributor pipe module.

8. The process as claimed in claim 5, wherein the one of the transverse pipes and the distributor pipe are formed in one piece and constitute a distributor pipe module.

9. An intake system for a combustion engine having at least two cylinder head rows comprising:
    an intake manifold for each of the cylinder head rows connected to pipes leading to cylinders,
    pipes connecting the intake manifolds to one another, and
    an air supply duct leading to at least one of the pipes,
    wherein each of the pipes is equipped with a switching valve to regulate air volume,
    wherein the air supply duct comprises a distributor pipe leading to one of the pipes equipped with a switching valve and connected downstream of a throttle valve housing,
    wherein an interior wall, integrated into the distributor pipe, divides the interior of the distributor pipe into two interior ducts of virtually equal cross section, and
    wherein the switching valve found in said one of the pipes has a valve axle which is mounted, on one end, to the interior wall.

* * * * *